No. 752,527. PATENTED FEB. 16, 1904.
A. E. DANIEL.
ANIMAL OR FISH TRAP.
APPLICATION FILED NOV. 4, 1903.
NO MODEL.
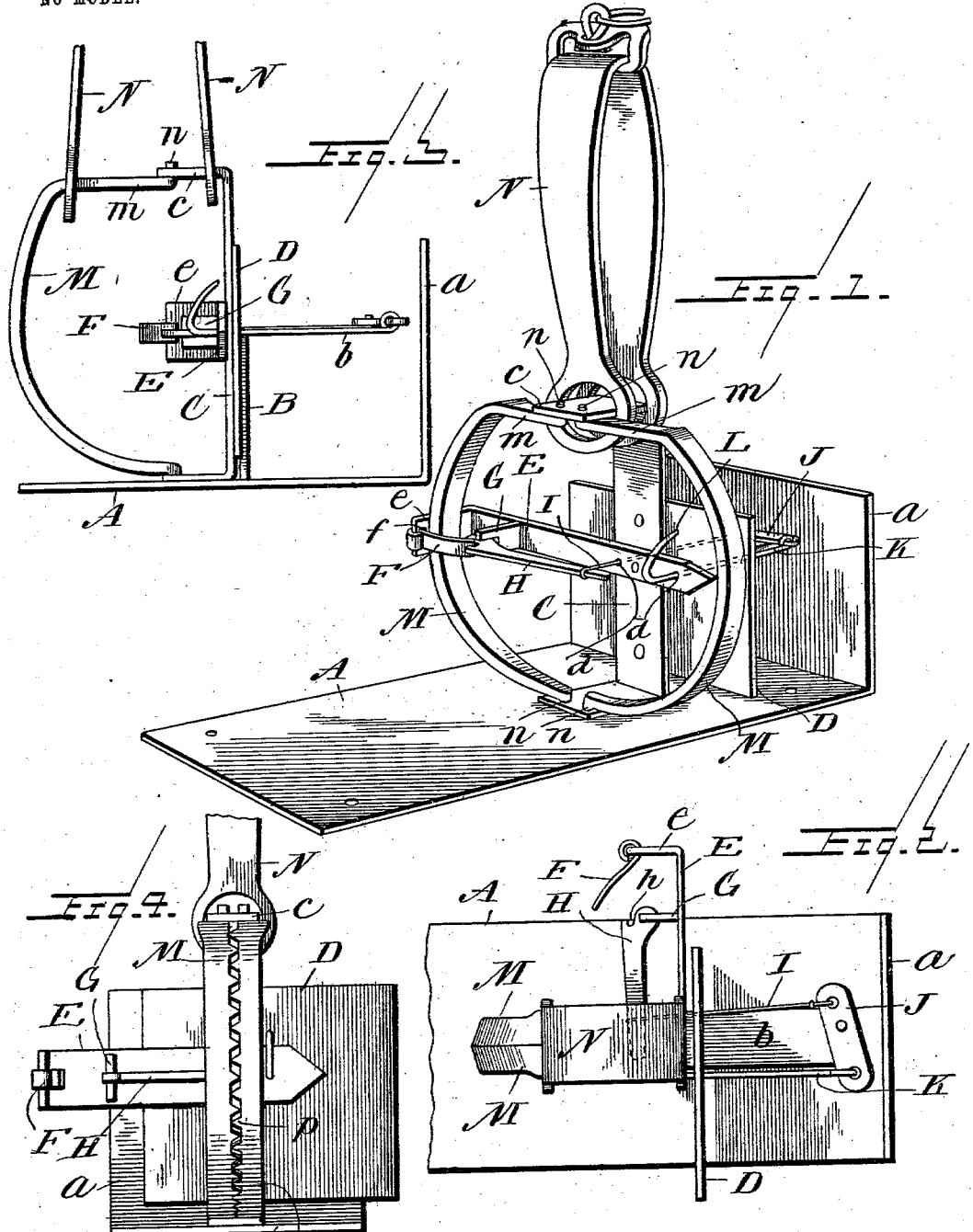
WITNESSES:
INVENTOR
Albert E. Daniel,
By
Attorney No. 752,527. Patented February 16, 1904.

UNITED STATES PATENT OFFICE.

ALBERT ENGLISH DANIEL, OF DANIELS LANDING, TENNESSEE.

ANIMAL OR FISH TRAP.

SPECIFICATION forming part of Letters Patent No. 752,527, dated February 16, 1904.

Application filed November 4, 1903. Serial No. 179,801. (No model.)

*To all whom it may concern:*

Be it known that I, ALBERT ENGLISH DANIEL, a citizen of the United States, residing at Daniels Landing, in the county of Perry and State of Tennessee, have invented certain new and useful Improvements in Animal or Fish Traps; and I do declare the following to be a full, clear, and exact description of the invention, such as will enable others skilled in the art to which it appertains to make and use the same.

This invention relates to snaring devices, and particularly to devices for snaring game and fish, although it is equally well adapted to rodents; and it has for its object to provide a simple, durable, and comparatively inexpensive device, which will be certain in operation, easy of adjustment, and adapted to be sprung by pulling on the bait or by pushing against the trigger; and it consists in the parts and combinations of parts hereinafter described and claimed.

In the accompanying drawings, forming a part of this specification, Figure 1 is a perspective view showing the trap set; Fig. 2, a plan view; Fig. 3, a side elevation; and Fig. 4, a front elevation of the jaws, showing them toothed.

Similar letters refer to similar parts throughout the several views.

Referring to the drawings, A represents a base-plate having one end bent upwardly at right angles, as at $a$, said base-plate being perforated at suitable points in order to provide for the passage of screws or nails or stakes to secure it firmly to logs, planks, or to the ground. To the base-plate is secured one end of a standard B, which extends vertically upward therefrom and is bent at right angles toward the end plate $a$ to form a horizontal support $b$, and adjacent said standard B is secured a similar standard C, which projects upwardly past the standard B and has its end bent at right angles in a direction opposite to that of support $a$ to form a bearing-plate $c$ for the jaws of the trap, as will be explained hereinafter. Between the standards B and C is firmly secured a plate D, the upper edge of which is approximately on line with the plate $a$. The plate D is formed with two openings, which coincide with the two similar openings $d$, formed in a bar E, which is secured near one end to the standard C and projects at right angles to a point beyond the side of the base-plate, and is bent forward at its end, as at $e$, and slotted, as at $f$, to receive the end of a catch F, which is secured in said slot, so as to be free to swing horizontally. A short arm or ear G is secured to and projects at right angles from the bar E, to which is hinged one end of a trigger H. The trigger H is notched at one end, as at $h$, to receive the free end of the catch F, and the other end is connected by a rod I, passing through one of the openings $d$ and through plate D to one arm of a lever J, fulcrumed to the support $b$. The other arm of the lever J is connected by a rod K, which extends through the plate D and the other opening $d$, and is formed or provided with a hook L, to which the bait is to be attached.

The jaws M, between which the animal or fish is caught, are preferably bow-shaped, with their upper ends approximately straight, as at $m$, and they are formed with trunnions $n$, which have their bearings at one end in the base-plate and at the other end in the plate $c$, so as to be adapted to be widely opened or spread apart, as shown in Fig. 1, and to close one against the other, as shown in Figs. 2 and 3. The jaws are normally held closed or in their unset position by a spring N, which consists of a flat or leaf spring bent upon itself and having its enlarged ends formed with large circular openings, through which the jaws are passed before they are hung in position.

In setting the trap the hook is baited and the spring is compressed and the jaws swung open until one jaw enters the space between the end $e$ of the bar E and the arm or ear G. The catch F is then swung into position to engage the notch in trigger H and the spring allowed to expand, thereby forcing the jaw against the catch, which thus serves to hold the jaws open. The trap may be sprung by the animal or fish catching hold of and pulling on the bait, and thereby swinging or turning the lever J, and thus disengaging the trigger from the catch, or it may be sprung by the animal or fish pushing against the trigger, and thereby releasing the catch.

The plate D serves to prevent the animal or fish from reaching the bait from any point except from the front, and as a further protection against the accidental springing of the trap the space between the plates $a$ and D may be inclosed so that the lever J may not be tampered with. Thus it will be observed that the jaws may be operated by pulling on the hook or by pushing or pressing the trigger H rearwardly, as by an animal or fish touching it.

In using my trap for fish the jaws are formed with spikes or teeth, as shown in Fig. 4, so that the fish may be impaled thereby. For this use the trap is lowered into the water by means of a line and rests on the bottom of the stream. The trap is also adapted to catch water-fowl, for which use it may be secured to a float and anchored by a weight in rivers, ponds, or lakes.

Among the advantages possessed by my trap is its adaptability to such a variety of uses by reason of its peculiar construction and from the fact that it may be sprung by a pull on the bait or by contact with the trigger, such as a fish would make in darting at the bait.

Having thus described my invention, what I claim as new, and desire to secure by Letters Patent, is—

1. A jaw-trap, comprising a pair of hinged jaws, a spring for operating said jaws, a trigger, a catch, a bait-holder, and means arranged between said trigger and bait-holder and connecting the same, whereby the trap may be sprung by the bait-holder or trigger.

2. A trap, comprising a pair of hinged or pivoted jaws, a spring for operating said jaws, a pivoted trigger, a bait-holder, a lever, a rod connecting one arm of said lever and the free end of said trigger, and a hooked rod connected to the other arm of said lever.

3. A trap, comprising a pair of hinged jaws, a spring for operating said jaws, a hinged trigger, a hinged catch for engaging said trigger, a lever, a plate arranged between said lever and trigger, a rod connecting said trigger and one arm of said lever, and a hooked rod connected to the other arm of said lever and extending through said plate.

In testimony whereof I affix my signature in presence of two witnesses.

ALBERT ENGLISH DANIEL.

Witnesses:
T. C. BRITT,
W. A. WALKER.